April 6, 1937.  H. GLAENZER ET AL  2,076,231
ELECTRIC LOCOMOTIVE BED FRAME
Filed Dec. 12, 1934   3 Sheets-Sheet 1
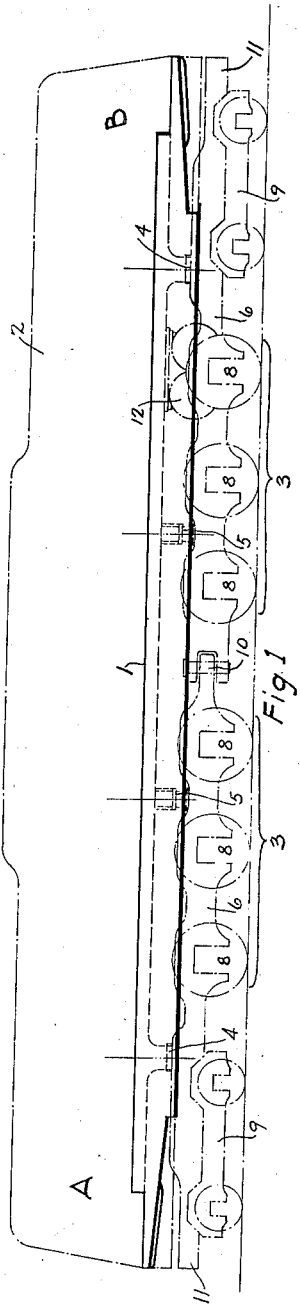
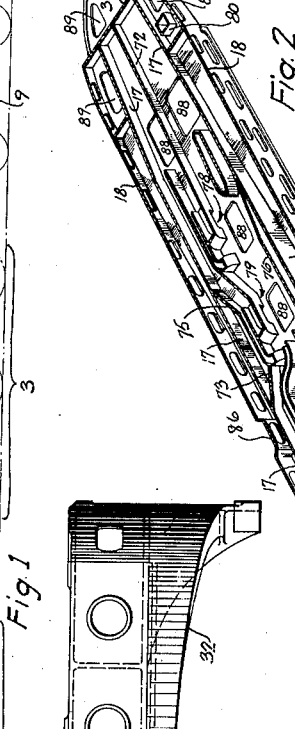
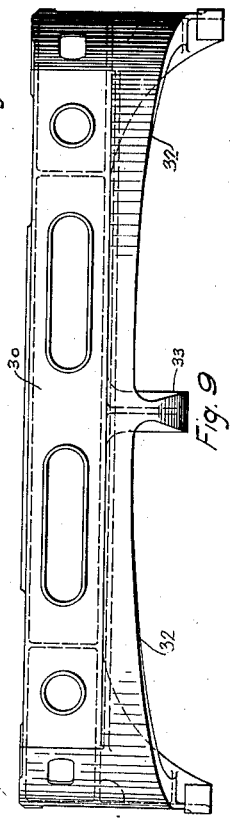
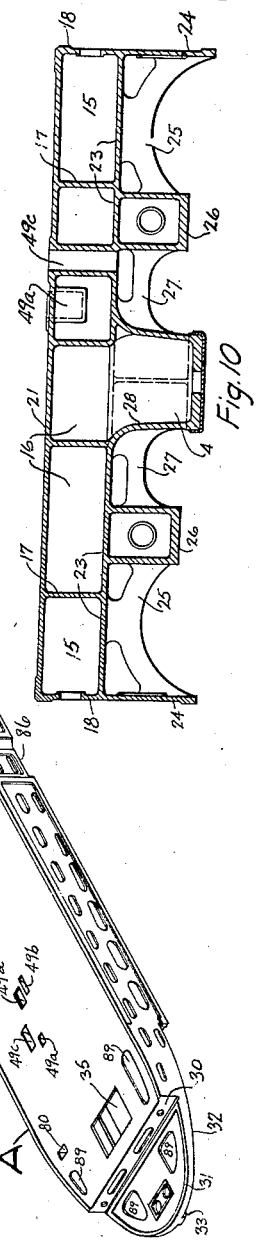
INVENTORS
Harry Glaenzer
Lawrence L. Neebe
BY
ATTORNEY April 6, 1937.   H. GLAENZER ET AL   2,076,231
ELECTRIC LOCOMOTIVE BED FRAME
Filed Dec. 12, 1934    3 Sheets-Sheet 2

INVENTORS
Harry Glaenzer
Lawrence L. Neebe
BY
ATTORNEY

April 6, 1937.    H. GLAENZER ET AL    2,076,231
ELECTRIC LOCOMOTIVE BED FRAME
Filed Dec. 12, 1934    3 Sheets-Sheet 3
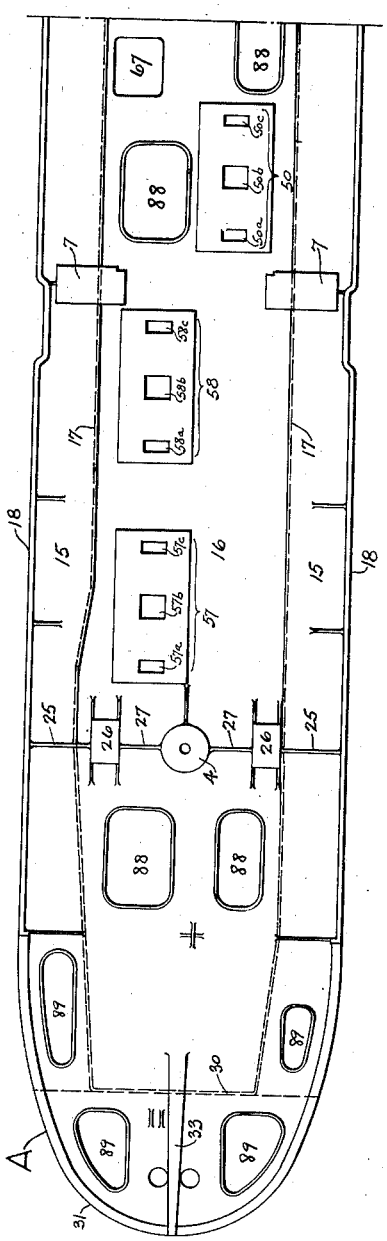
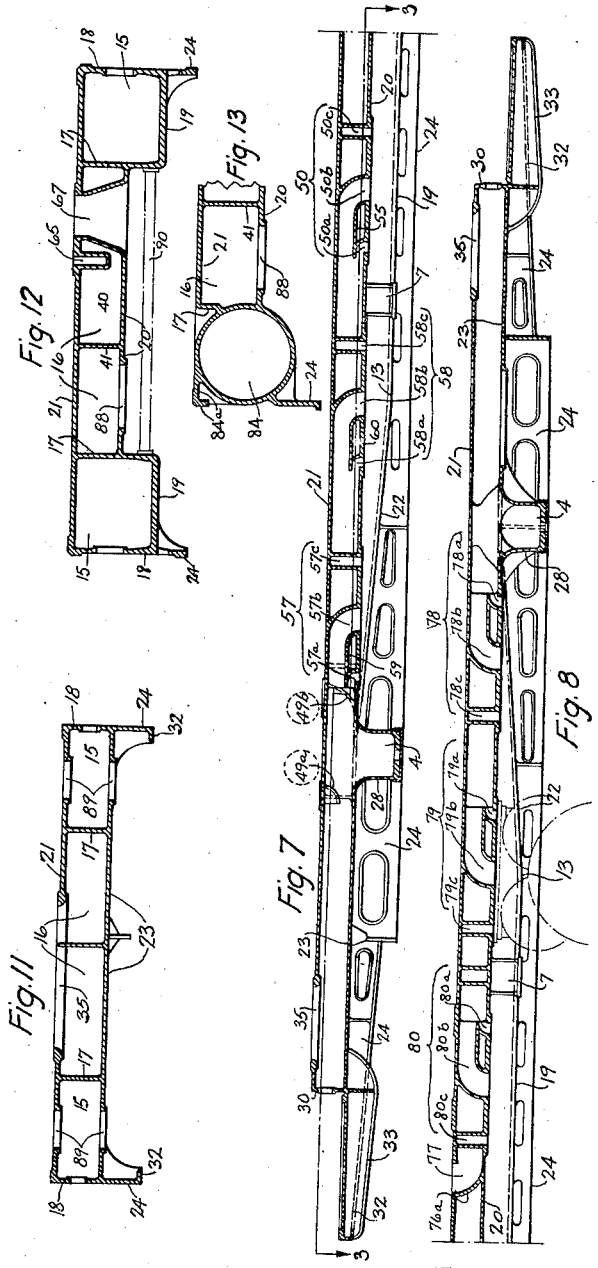
INVENTORS
Harry Glaenzer
Lawrence L. Neebe
BY
ATTORNEY Patented Apr. 6, 1937

2,076,231

UNITED STATES PATENT OFFICE 2,076,231

ELECTRIC LOCOMOTIVE BED FRAME

Harry Glaenzer, Philadelphia, Pa., and Lawrence L. Neebe, Woodbury, N. J.

Application December 12, 1934, Serial No. 757,183

20 Claims. (Cl. 105—415)

This invention relates generally to electric locomotives employing an integrally cast bed frame and relates more particularly to electric locomotives of the articulated type wherein the driving mechanism consists of electric motors mounted on two sets of running gears or sub-frames coupled together and both supporting a common upper main or bed frame upon which the cab or superstructure is mounted.

One object of our invention is to provide an improved integrally cast bed frame of such form as to be easily cast with improved air ducts for cooling the motors or other electrical equipment while at the same time insuring maximum strength by the cooperative reenforcing effect of the integrally cast duct walls and arrangement of the same together with other elements of the frame. Another object is to provide such an improved form and arrangement of integrally cast bed frame that the flow of air throughout the air ducts is properly proportioned to insure least possible obstruction or reduction in pressure, this being accomplished by sub-dividing a main girder conduit into sub-conduits and then providing each sub-conduit with groups of passages extending directly within the sub-conduits to divert air therefrom. A more specific object in this respect is to have the walls of the groups of passages and sub-conduits so formed that they not only impart strength to the bed frame by being integral therewith but also cause the air to be smoothly turned into the outlet openings leading from the bed frame.

In one aspect of the invention we have provided an improved bed frame formed of two outer girders of box section joined by an intermediate girder also of box section, the intermediate box girder being arranged as a self-contained air conduit within the entire integrally cast frame, each end of this intermediate girder conduit having independent sub-conduits. The outer girders are of greater depth than the intermediate girder through the longitudinal middle portion of the bed frame, the three girders as they approach the two ends of the frame being arranged to have the same depth whereby a common bottom wall extends across all three girders.

Another object is to so construct and arrange the elements of our improved integrally cast bed frame so as to provide streamlined ends in a simple and effective manner, this being accomplished while at the same time imparting reinforcing strength to the frame in a simple, effective and cooperative manner without adding complications thereto.

Other objects and advantages will be more apparent to those skilled in the art from the following description of the accompanying drawings, in which:

Fig. 1 is an elevational view partly in outline showing the application of our improved bed to two sets of running gear with the cab in dot and dash lines;

Fig. 2 is a perspective view of the bed with part of the top plate removed;

Fig. 6 is a bottom view of Figs. 3 and 7;

Fig. 7 is a sectional elevation taken on line 7—7 of Fig. 3;

Fig. 8 is a sectional elevation taken on line 8—8 of Fig. 4;

Fig. 9 is an end view of the bed;

Fig. 10 is a sectional view on the line 10—10 of Fig. 3;

Fig. 11 is a sectional view on the line 11—11 of Fig. 3;

Fig. 12 is a sectional view on the line 12—12 of Fig. 3;

Fig. 13 is a transverse section of a modified form for the outer girders or portions thereof.

Figure 3:
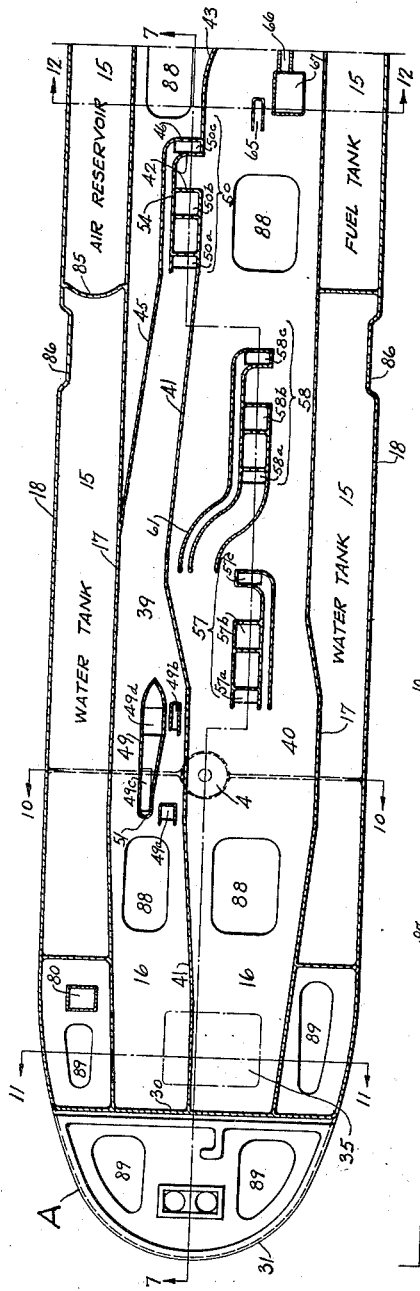
Fig. 3 is a plan view of one-half of the length of the bed partly in section and taken on the line 3—3 of Fig. 7.

In the particular embodiment of the invention which is shown herein merely for the purpose of illustrating one specific form among possible others that the invention might take in practice, we have provided a bed 1 for supporting a cab 2, the cab being attached thereto by welding, riveting or other suitable means. The bed is mounted on two sets of running gear 3 by means of usual center plates 4 and spring plungers 5, the plungers being carried by running gear frames 6 and bear on pads 7 formed on the under side of the bed 1. Each running gear frame is mounted on a plurality of driving wheels 8 specifically shown as three pair to each frame, although this number may vary in accordance with the capacity of the locomotive. The running gear frames are further supported at their remote ends by usual wheeled trucks 9 and are coupled together as at 10. Usual draft rigging is applied at 11. Twin electric motors diagrammatically shown at 12 are mounted immediately over each of the driving wheels to drive the same. All of this running gear arrangement is well known and will not be further described as it does not form any part of our invention.

The bed as shown in the transverse section of Fig. 12 is sub-divided generally into three elementary geometrical structures, viz., two outer longitudinal box girders 15 and a longitudinal intermediate box girder 16 which is generally of oblong formation in transverse section (duct walls being disregarded for the present). Each of the outer girders comprises an inner wall 17 and an outer wall 18, the inner walls 17 also constituting the walls of the intermediate girder. A common top plate or wall 21 extends over the whole of the outer and intermediate girders. As shown in Fig. 12, the outer box girders are provided with a bottom wall 19 and the intermediate girder is provided with a bottom wall 20. The vertical depth of the outer girders is greater than that of the intermediate girder, and this relation extends from a point 13 adjacent the spring plunger bearing pads 7, Figs. 7 and 8. However, from these two points 13 on to the ends of the frame, the bottom walls 19 of the outer girders incline upwardly as at 22 and finally merge with the bottom 20 of the intermediate girder substantially adjacent the center plates 4. These two merged bottom walls thence continue as a common bottom wall 23 to substantially the ends of the bed frame. As a result of this construction, considerable strength is given to the central portion of the bed. The outer plates 18 of the outer girders extend as at 24 below the bottom walls 19 for practically the full length of the bed, thus giving additional stiffness and a greater surface for attaching the cab superstructures which may be of the usual rolled steel plate construction attached to suitable pads and finishing strips on the bed by any of the usual methods such as riveting, welding or bolting. As shown in Fig. 10, the extensions 24 are laterally connected to the center plates 4 to reinforce the same against the load which is mostly concentrated at this point, this connection comprising specifically lateral braces or webs 25 extending between extensions 24 and side bearings 26 depending from the common bottom wall 23. Further lateral braces or webs 27 connect the side bearings 26 with the center plate 4. The common bottom wall 23 extends across the top of side bearings 26 but this wall does not extend across the top of center plate 4. Instead the walls 28 of the center plate are preferably formed as a recessed continuation of the bottom wall 23. The ends of all three girders are closed by a vertical end plate 30.

In order to provide simple and effective ends 31 and yet have them structurally and functionally interrelated with the bed frame, we have caused said ends to be formed along sweeping curves in plan view as shown in Fig. 7. This curvature commences substantially midway between the center plates 4 and end walls 30. Notwithstanding that the ends are thus progressively narrowed by the sweeping semi-elliptical curvature thereof, yet maximum strength is imparted to these ends by virtue of having the side plate extensions 24 continue forwardly with a gradually upwardly inclined flanged edge 32, Figs. 7 and 8. A tapered I-section arm 33 projects forwardly from beneath the bottom wall 23 to the front of end 31.

As is usual in electric locomotives, a suitable motor-driven blower or blowers (not shown) are provided to circulate cooling air over the electric motors, main transformers, motor control switches and various auxiliaries located in the cab. While various arrangements have been heretofore proposed for conducting this air to the various devices above mentioned, yet such prior constructions have been deficient either in their functional operation of efficiently conducting the air flow or of insuring maximum strength in the bed frame consistent with effective and efficient distribution of the air. In our improved bed frame, we have provided an improved structural and functional relation of parts for overcoming deficiencies in prior bed frames. To this end, we have provided the general structural features of the bed frame as hereinbefore described and utilize this structure in combination with further characteristics to be presently described. The intermediate girder is employed as a central or main conduit, air entering from usual blowers through openings 35 and 36 at each end of the frame respectively, Figs. 3, 4, 7 and 8. This central conduit is partitioned approximately midway of the length of the frame so that the conduit in one end of the frame is supplied with air through opening 35, Fig. 3, and the conduit in the other end of the frame is supplied with air through opening 36, Fig. 4. The conduit which is supplied through opening 35 is sub-divided longitudinally into two parallel sub-conduits 39 and 40, these conduits being formed by a vertical partition 41 connecting the upper wall 21 and lower walls 20 and 23 and extending longitudinally along a predetermined irregular line to cause conduit 40 to have a progressively increasing cross-sectional area and conversely for conduit 39, although the cross-sectional area of conduit 40 is diminished after its mid-section is passed. The partition 41 continues as at 42 and then turns as at 43 to terminate in an end wall 44, Fig. 4, joining the wall 17. An end closure is also provided for conduit 39 in the form of an angular partition 45 which finally turns as at 46 to join partition 41 and thus provide a definite closed end for conduit 39.

Conduit 39 is provided with groups of branch passages, the groups being generally indicated at 49 and 50 respectively. The group 49 has four passages 49a–d. The passages 49a and 49b conduct air from conduit 39 upwardly through the top wall 21 of the bed frame and thence to the motor control switches which serve the two outer pairs of twin motors for the driving wheels, the control switches being located in the cab 2. Exhaust air from these control switches is discharged directly downwardly through the bed frame through exhaust passage 49c. This exhaust passage does not connect into conduit 39 but instead it is encircled by a streamlined wall 51 which includes passage 49d through which the motor leads are passed for this group of motors.

The group 50 comprises passages 50a, 50b and 50c which are shown in vertical section in Fig. 7. As shown in Fig. 3, a wall 54 forms the side of passage 50a and 50b and also provides one wall of a narrow passageway through which air is conducted from the main conduit 39 to passage 50c. As shown in Fig. 7, the air for passages 50a and 50b is smoothly directed thereto by the provision of a horizontal baffle 55. It will be noted that the bends of each of these passages is formed by a smoothly curving surface formed as an integral part of the frame and structurally interrelated therewith to strengthen the same in addition to increasing the uniform and steady flow of air. The passage 50b is approximately twice the capacity of either passage 50a or 50c. This is because passage 50b furnishes air to the inner sides of two twin motors while passages 50a and 50c furnish air respectively for the outside of one motor, although it will of course be understood that various relative proportions between these passages may be had depending upon the conditions of operation.

Conduit 40 is provided with two groups of passages 57 and 58 having passages 57a—c and 58a—c functioning respectively in the same manner as passages 50a—c. Also the passages 57a and b and 58a and b are formed by horizontal webs 59 and 60, Fig. 7. The group of passages 58 are also provided with three laterally curved baffles 61 thereby permitting air to be effectively diverted from the main conduits 40 while at the same time permitting the two groups of passages 57 and 58 to be maintained substantially in longitudinal alignment with each other but without any restriction in flow to passages 58 by the passages 57. Passages 65 and 65a, Figs. 3, 4 and 12, divert air from conduit 40 upwardly through top wall 21 for cooling certain of the motor controls. Exhaust air from these particular controls is discharged entirely through the bed frame as by a passage 66, Figs. 3 and 4, this passage being formed by a wall cast integrally with the bed frame. Motor leads are passed through a walled opening 67, Figs. 3 and 12, extending entirely through the frame. The main transformer is cooled by air circulated upwardly from conduit 40 through an outlet 68, Fig. 4, in the top wall 21, it being noted that this opening is adjacent to the end wall 44.

The foregoing disclosure constitutes all of the conduits and passages for that half of the bed frame shown in Fig. 3. The conduits and passages for the other half of the bed frame are somewhat similar to those described for the first half although there are certain detailed variations to be noted.

Figure 4:
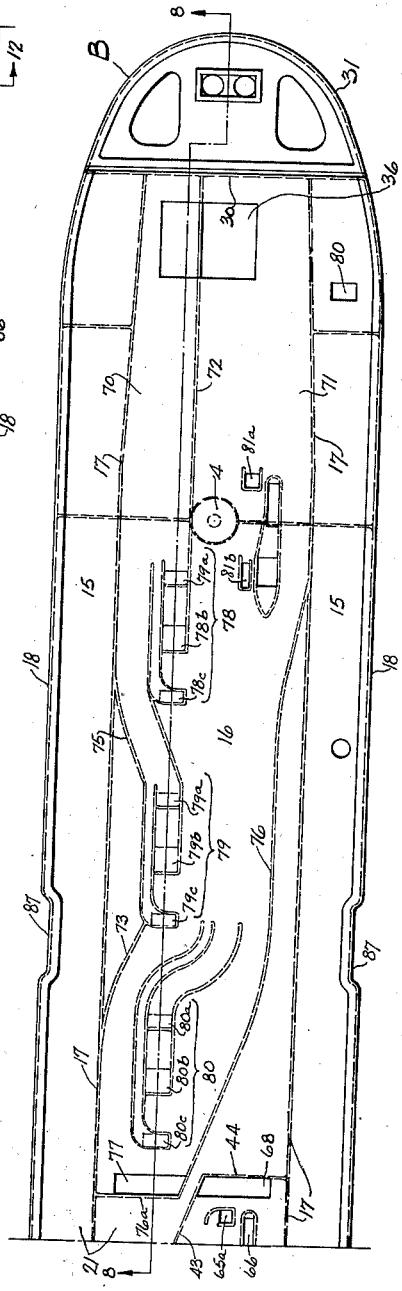
Fig. 4 is a plan view of the other half of the bed shown in Fig. 3, the interior arrangement of the conduits being shown in dotted lines.
Figure 5:
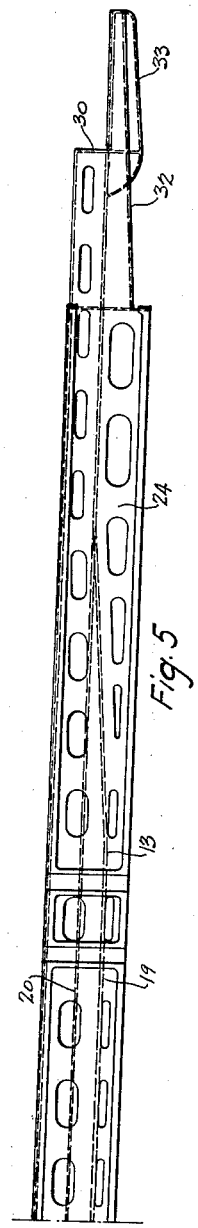
Fig. 5 is a side elevation of Fig. 4.

Air entering opening 36 from a suitable blower, Fig. 4, is divided to flow through two substantially parallel conduits 70 and 71 formed by a vertical partition 72 which extends along an irregular line to finally terminate in a partition 73 which merges with the inner wall 17 of the outer box girders 15. A wall 75 narrows down conduit 70 near one end while likewise a wall 76 narrows down conduit 71 toward an end wall 76a as the conduit approaches an outlet 77 which conducts air to a main transformer. Groups of passages respectively indicated at 78 and 79 divert air from conduit 70 and likewise groups of passages 80 and 81 divert air from conduit 71. The arrangement of these groups of passages is not symmetrical with respect to similar passages 49, 50, 57 and 58 at the other end of the bed frame. This lack of symmetry is because the electrical apparatus is not symmetrically located in the cab. Hence in general it is not necessary to describe the detailed construction and outlets for the group of passages 78—81 as their general purpose is substantially the same as for those passages at the other end of the bed frame. It will be noted, however, that the cross-sectional area of conduits 70 and 71 is so proportioned with respect to the groups of passages as to insure uniform and efficient flow substantially throughout the conduits and passages while at the same time insuring maximum structural cooperation between the passage walls and the walls of the bed frame thereby to provide a very rigid frame with minimum weight. The passages in all groups are also formed with smoothly curved bends at the corners similar to the curved bends shown in Fig. 7 and also horizontal baffles such as 55, 59 and 60 are employed to divert the desired proportionate amount of air through each opening. In addition any other suitable walled ducts or walls such as a blower duct exhaust 80, Figs. 3 and 4, may extend directly through the bed frame.

The outer girders can be utilized to function for various purposes such as water tanks, fuel tanks and air reservoirs as indicated by legends in Fig. 3. When a section of the outer girder 15 is used as a fluid reservoir for high pressure purposes such as when used as an air reservoir for the brake equipment, its cross-section will be circular in shape as at 84, Fig. 13, in order to resist the internal high pressure. This shape will blend into the rectangular section at each end of the air reservoir portion. This circular section is herein broadly considered as of substantially box section having the same structural strength as the remaining structure. The upper outer corner is provided with what constitutes a continuation 84a of the top wall 21 while the downwardly projecting side extends from the lower outer corner of the circular section. It will also be noted in connection with the air reservoir that a bulkhead or end 85, Fig. 3, are curved to effectively resist high pressure air that might be used for the brake apparatus. Also as indicated at 86 and 87 in Figs. 3 and 4, the outer walls of the outer girders are recessed to permit steps and hand rails to be set in a sufficient distance to obtain proper external clearance for the locomotive without sacrifice of strength.

It will, of course, be understood that various core holes such as 88 may be provided at various parts of the casting and then suitably covered by plates to make the conduits and tanks completely airtight where necessary. Other core openings for both minimizing the weight of the frame and also for removing the cores may be provided at any other desired points such as 89, and in certain instances such as at the ends of the frame these openings do not need to be covered by plates. As shown in Fig. 12, an equalizing pipe 90 preferably connects such portions of the two outside girders as are used for the same purpose, for example, water or fuel oil.

It will of course be understood that various changes in details of construction and arrangement of parts may be made by those skilled in the art without departing from the spirit of the invention as set forth in the appended claims.

We claim:

1. An integrally cast bed frame for electric locomotives comprising, in combination, a pair of outer girders of box section, and an intermediate girder also of box section, said outer and intermediate girders having common walls extending for substantially the entire length of the frame.

2. The combination set forth in claim 1 further characterized in that the intermediate girder is of oblong formation in transverse section.

3. An integrally cast bed frame for electric locomotives comprising, in combination, a pair of outer girders of box section, and an intermediate girder also of box section, said outer and intermediate girders having common walls extending for substantially the entire length of the frame and a substantial portion of the length of the pair of outer box girders being substantially of square formation in transverse section.

4. An integrally cast bed frame for electric locomotives comprising, in combination, a pair of outer girders of box section, and an intermediate girder also of box section, said outer and intermediate girders having common walls extending for substantially the entire length of the frame and at least in certain transverse sections the pair of outer girders being of greater vertical depth than the intermediate girder.

5. An integrally cast bed frame for electric locomotives comprising, in combination, a pair of outer girders of box section having bottom walls tapering upwardly toward the ends of the frame, and an intermediate girder also of box section, said outer and intermediate girders having common walls extending for substantially the entire length of the frame and said outer girders being at least in certain transverse sections of greater vertical depth than the intermediate girder.

6. An integrally cast bed frame for electric locomotives comprising, in combination, a pair of outer girders of box section having bottom walls, an intermediate girder also of box section having a bottom wall, and walls common to said intermediate and outer girders extending for substantially the entire length of the frame, said outer girders being at least in certain transverse sections of greater vertical depth than the intermediate girder and said bottom walls of the outer girders tapering upwardly toward the ends of the frame to merge with said bottom wall of the intermediate girder, whereby all three girders are of substantially the same depth near the ends of the frame.

7. An integrally cast bed frame for electric locomotives comprising, in combination, a pair of outer girders of box section having bottom walls tapering upwardly toward the ends of the frame, an intermediate girder also of box section, and walls common to said intermediate and outer girders extending for substantially the entire length of the frame, said outer girders at least in certain transverse sections being of greater vertical depth than the intermediate girder and having outer walls with portions projecting below said bottom walls.

8. An integrally cast bed frame for electric locomotives comprising, in combination, a pair of outer girders of box section, an intermediate girder also of box section, said pair of outer girders being at least in certain transverse sections of greater vertical depth than the intermediate girder, and the bottom walls of the outer girders tapering upwardly toward the ends of the frame, the outer girders having outer walls with portions projecting below the bottom wall thereof and extending for substantially the full length of the bed frame, the combined vertical distance of said projecting portion and the outer wall of the outer girders being of uniform height.

9. An integrally cast bed frame for electric locomotives comprising, in combination, a pair of outer girders of box section, an intermediate girder also of box section, the outer walls of said pair of girders having downwardly projecting portions and the combined height of said portions and outer walls being substantially uniform substantially throughout the length of the frame.

10. An integrally cast bed frame for electric locomotives comprising, in combination, a pair of outer girders of box section, an intermediate girder also of box section, said outer and intermediate girders having common walls extending for substantially the entire length of the frame, and forwardly projecting semi-elliptical curved ends in which said outer and intermediate girders are contained.

11. An integrally cast bed frame for electric locomotives comprising, in combination, a pair of outer girders of box section, an intermediate girder also of box section, said outer and intermediate girders having common walls extending for substantially the entire length of the frame and the outer girders being provided with transverse partitions or bulkheads to provide reservoirs, and said intermediate girder comprising an air conduit having branches within the same for diverting air therefrom and conducting the air to the exterior of the frame.

12. A bed frame for electric locomotives comprising, in combination, a frame having an integral longitudinal member of box section forming an air conduit with top and bottom walls extending for substantially the entire length of said frame to form a stress resisting structure, and vertical partitions between said walls to reinforce the same and to form branch passages within said conduit for diverting air therefrom and conducting the air to the exterior of the frame.

13. An integrally cast bed frame for electric locomotives comprising, in combination, a frame having an integral longitudinal girder of box section forming an air conduit with top and bottom walls extending for substantially the entire length of said frame to form a stress resisting structure, and vertical partitions between said walls to reinforce the same and formed integrally with said girder to divide the same into a pair of substantially parallel conduits.

14. An integrally cast bed frame for electric locomotives comprising, in combination, a frame having an integral longitudinal member of box section forming an air conduit with top and bottom walls extending for substantially the entire length of said frame to form a stress resisting structure, and a vertical transverse intermediate partition formed integrally with said box member to reinforce the same and to provide independent conduits in each longitudinal half of the frame.

15. An integrally cast bed frame for electric locomotives comprising, in combination, a frame having an integral longitudinal girder of box section forming an air conduit with top and bottom walls extending for substantially the entire length of said frame to form a stress resisting structure, and longitudinal and transverse vertical partitions formed integrally with said girder to reinforce and to divide the same into a pair of substantially parallel conduits in each longitudinal half of the frame.

16. An integrally cast bed frame for electric locomotives comprising, in combination, a frame having an integral longitudinal girder of box section forming an air conduit with top and bottom walls extending for substantially the entire length of said frame to form a stress resisting structure, longitudinal and transverse vertical partitions formed integrally with said girder to reinforce and to divide the same into a pair of substantially parallel sub-conduits in each longitudinal half of the frame, and groups of branch passages disposed within each of said sub-conduits for diverting air therefrom and conducting the air to the exterior of the frame.

17. An integrally cast bed frame for electric locomotives comprising, in combination, a frame having an integral longitudinal girder of box section forming an air conduit with top and bottom walls extending for substantially the entire length of said frame to form a stress resisting structure, longitudinal and transverse vertical partitions formed integrally with said girder to reinforce and to divide the same into a pair of substantially parallel sub-conduits in each longitudinal half of the frame, and groups of branch passages disposed within each of said sub-conduits for diverting air therefrom and conducting the air to the exterior of the frame, the cross-sectional area of the sub-conduits being proportional to the volume of air flow through successive portions thereof, whereby said conduits are of progressively smaller cross-sectional area as the groups of passages divert air therefrom.

18. An integrally cast bed frame for electric locomotives comprising, in combination, a frame having an integral longitudinal girder of box section forming an air conduit with top and bottom walls extending for substantially the entire length of said frame to form a stress resisting structure, longitudinal and transverse vertical partitions formed integrally with said girder to reinforce and to divide the same into a pair of substantially parallel sub-conduits in each longitudinal half of the frame, and groups of branch passages disposed within each of said sub-conduits for diverting air therefrom and conducting the air to the exterior of the frame, said bed frame having openings extending entirely therethrough and provided with walls formed integrally with the frame.

19. An integrally cast bed frame for electric locomotives comprising, in combination, a frame having an integral longitudinal girder of box section forming an air conduit with top and bottom walls extending for substantially the entire length of said frame to form a stress resisting structure, longitudinal and transverse vertical partitions formed integrally with said girder to reinforce and to divide the same into a pair of substantially parallel sub-conduits in each longitudinal half of the frame, groups of branch passages disposed within each of said sub-conduits for diverting air therefrom and conducting the air to the exterior of the frame, said bed frame having an opening extending entirely therethrough and within the region of a conduit, and a streamlined wall disposed within the conduit and formed integrally with the bed frame to surround said opening.

20. An integrally cast bed frame for electric locomotives comprising, in combination, a pair of outer girders a portion of which is of circular cross-section and another portion of which is of box section, and an intermediate girder also of box section, said outer and intermediate girders having common walls extending for substantially the entire length of the frame.

HARRY GLAENZER.
LAWRENCE L. NEEBE.